United States Patent [19]

Watanabe et al.

[11] Patent Number: 4,632,316

[45] Date of Patent: * Dec. 30, 1986

[54] METHOD AND APPARATUS FOR ELECTROMAGNETICALLY CRUSHING, MIXING AND STIRRING SUBSTANCES BY CHANGING THE ELECTROMAGNETIC FIELD INTENSITY LEVEL

[75] Inventors: Yasuo Watanabe; Mitsuhiro Nakamura, both of Kanagawa, Japan

[73] Assignee: Fuji Electric Co., Ltd., Kanagawa, Japan

[*] Notice: The portion of the term of this patent subsequent to Jul. 22, 2003 has been disclaimed.

[21] Appl. No.: 436,694

[22] Filed: Oct. 26, 1982

[30] Foreign Application Priority Data

Oct. 30, 1981 [JP]  Japan ................... 56-174011

[51] Int. Cl.$^4$ ............................................. B02C 17/00
[52] U.S. Cl. ..................................... 241/26; 241/30; 241/170; 241/284; 51/7
[58] Field of Search .............. 252/62.51; 523/300; 51/7, 163.1; 366/341, 349, 118, 273, 274; 241/284, 1, 301, 170, 172, 184, 26, 30

[56] References Cited

U.S. PATENT DOCUMENTS 2,852,586  9/1958  Steele .
2,880,554  4/1959  Simjian .
3,423,880  1/1969  Hershler .............................. 241/1 X
3,848,363  11/1974  Louness et al. .
3,987,967  10/1976  Kuznetsov et al. ...................... 241/1

FOREIGN PATENT DOCUMENTS 564950  7/1977  U.S.S.R. .
638370  12/1978  U.S.S.R. .
737199  5/1980  U.S.S.R. ............................... 51/163.1

Primary Examiner—Mark Rosenbaum
Attorney, Agent, or Firm—Brumbaugh, Graves, Donohue & Raymond

[57] ABSTRACT

A method and apparatus for processing substances electromagnetically having a container for receiving conductive working pieces and substances to be processed and magnetic field generators located adjacent said container to generate violent random motion of said working pieces is disclosed. The method comprises the steps of operating said apparatus at a first magnetic field intensity level slightly greater than the minimum intensity level required to generate random motion of said working pieces, and then periodically either increasing or decreasing the intensity level from said first intensity level to maintain random motion of said working pieces. Similarly, the apparatus comprises a timing mechanism which periodically either increases or decreases the intensity level from said first intensity level.

5 Claims, 5 Drawing Figures

METHOD AND APPARATUS FOR ELECTROMAGNETICALLY CRUSHING, MIXING AND STIRRING SUBSTANCES BY CHANGING THE ELECTROMAGNETIC FIELD INTENSITY LEVEL

BACKGROUND OF THE INVENTION

This invention relates to a method and apparatus for electromagnetically processing substances by crushing, mixing and stirring the substances and more particularly to an apparatus equipped with a container for receiving ferromagnetic or non-magnetic conductive working pieces together with substances to be processed by causing a shifting magnetic field to act on and generate a strong random motion of the working pieces.

The background of the invention will be discussed with reference to a prior art device for electromagnetically processing substances of the type described, for example in the copending Watanabe et al application Ser. No. 417,204 filed Sept. 13, 1982 and assigned to the assignee of the present application. As shown in FIGS. 1 and 2, a prior art apparatus comprises a container 1 for containing a number of ferromagnetic or non-magnetic working pieces 2 with substances to be processed. The container faces and is sandwiched between upper and lower shifting magnetic field generators 3, 4. Each of the shifting magnetic field generators 3, 4 is supplied with a coil 5 constructed of three-phase a.c. winding, for example, and generates oppositely directed shifting magnetic fields as shown by arrows $\phi 1$, $\phi 2$.

In the apparatus thus constructed, voltage is induced in the working pieces placed in the shifting magnetic fields, allowing an eddy current to flow. Due to reciprocal action between the current and the shifting magnetic fields, an electromagnetic driving force acts on the working pieces in the direction of the shifting magnetic field. In the case where the working pieces are ferromagnetic, a sucking force, in addition to the aforementioned driving force, works in the directions of the shifting magnetic field generators 3, 4. In contrast a repulsive force operates on non-magnetic material. As a result, because of the abovementioned electromagnetic action, the working pieces generate a strong, high speed random motion in the container and act on the substances in the container to simultaneously crush, mix and stir the substances. The same electromagnetic effect may be obtained by installing a shifting magnetic field generator on either the upper or lower side. Such an apparatus as described has various applications including pulverizing and mixing pulverulent bodies, mixing and stirring liquids, preparing emulsion, forming minute air bubbles, promoting chemical reactions and so on.

The random motion of the working pieces varies with the size and quality of the working pieces, the volume of the container, the percentage fullness of the container with working pieces, the intensity of the shifting magnetic field and so on. According to the results of various tests that have been made, a minimum magnetic field intensity level is required to generate a random motion of working pieces when the volume of a container, the size of working pieces and the percentage fullness of the container with working pieces are fixed. However, operating at this minimum magnetic field intensity level makes it difficult to maintain a stable random motion of the working pieces. Therefore, in order to maintain a practical operating level, a magnetic field intensity sufficiently greater than the aforementioned minimum magnetic field intensity level must be provided. In other words, although the working pieces generate a random motion initially when the apparatus is operated at the minimum magnetic intensity required to generate the random motion, the random movement of the working pieces is gradually reduced because of sucking force and repulsive force produced between the working pieces and the shifting magnetic field generators, and due to magnetic sucking force, collision, frictional force and the like between the working pieces. Ultimately, the working pieces completely cease to move and are put to one side, overlapping one another.

As shown in FIG. 3, most of the working pieces 2, which are ferromagnetic substances, for instance, are attached onto the side of the container 1 without moving as they are being sucked by the shifting magnetic field generators 3, 4. The working pieces 2 line up in a posture like piled up building blocks stuck together under the influence of their magnetic sucking force. Since the working pieces are put in a standstill state, processing of the substances is suspended. This kind of phenomenon may occur even for non-magnetic working pieces. However, if the magnetic field intensity of the shifting magnetic field is increased to a certain value, the electromagnetic driving force in the direction of the shifting magnetic field will increase so that the lined up working pieces will crumple and start their random motion again, to restore to a regular operating condition. As long as a relatively high magnetic field intensity is maintained from the beginning of the operation, suspension of a random motion of the working pieces will not occur.

Accordingly, for practical operation of such an apparatus the magnetic field intensity is sufficiently greater than the minimum magnetic field intensity required to generate a random motion. Continuous operation is obtained by using a high magnetic field intensity so that the random motion is not suspended midway through the operation. However, the conventional method of operation requires the application of excessive magnetic field intensity even during regular operating conditions in which the working pieces would generate sufficient random motion with low magnetic field intensity, which results in excessive power consumption to that extent. More specifically, the magnetic field intensity is proportional to the coil current of a shifting magnetic field generator, and loss in the coil is proportional to the square of the current. According to test results, the magnetic field intensity required to restart the random motion of working pieces suspended during the regular operation while the magnetic field is being applied is 50-80% greater than the minimum magnetic field intensity required to generate the aforementioned random motion. For this reason, the conventional method of operation has disadvantages in low operating efficiency, since approximately twice as much power consumption is required for the regular operation during the whole period of operation, and because of increasing heat loss, a greater cooling capability of a coil cooler is required.

SUMMARY OF THE INVENTION

The present invention is directed to the aforementioned problem and is aimed at offering an energy-saving apparatus and method in order to obtain continuous stable operation with a low power consumption.

The above object of the method according to the present invention is accomplished by conducting the processing operation with slightly greater magnetic field intensity than the minimum magnetic field intensity required to generate a random motion within a shifting magnetic field and by providing a periodic change in the intensity of the shifting magnetic field, for instance, by either intensifying the magnetic field for a short time or by reducing the magnetic field to essentially zero for a short time. Similarly, the apparatus according to the invention comprises means for periodically changing the intensity of the shifting magnetic field.

DETAILED DESCRIPTION OF THE PREFERRED EMBODIMENTS

The description of the embodiments of the present invention is given by reference to the drawings.

Figure 1:
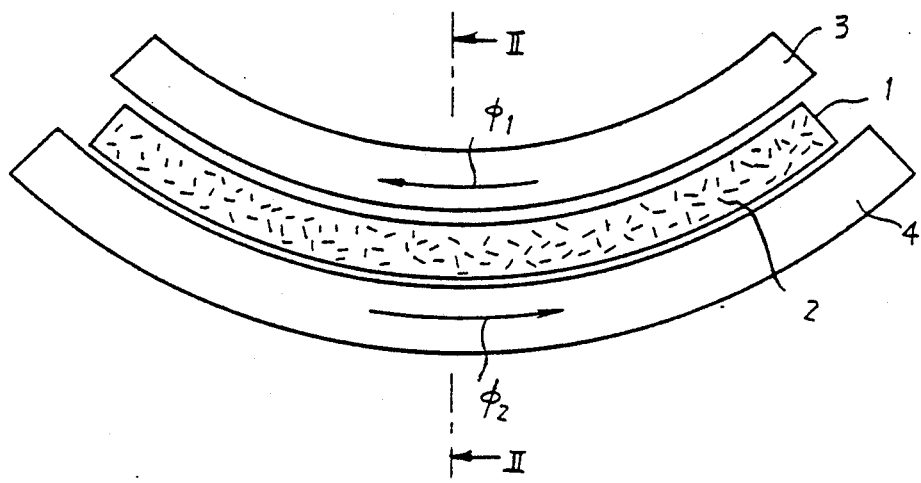
FIG. 1 is a schematic structural view of an apparatus for which the present invention is intended.
Figure 2:
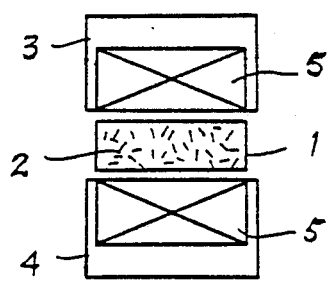
FIG. 2 is a cross-sectional view of a plane II—II in FIG. 1.
Figure 3:
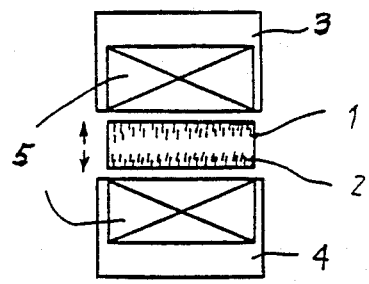
FIG. 3 is an operational diagram descriptive of the suspension of a random motion of working pieces by the operating method of the prior art.
Figure 4:
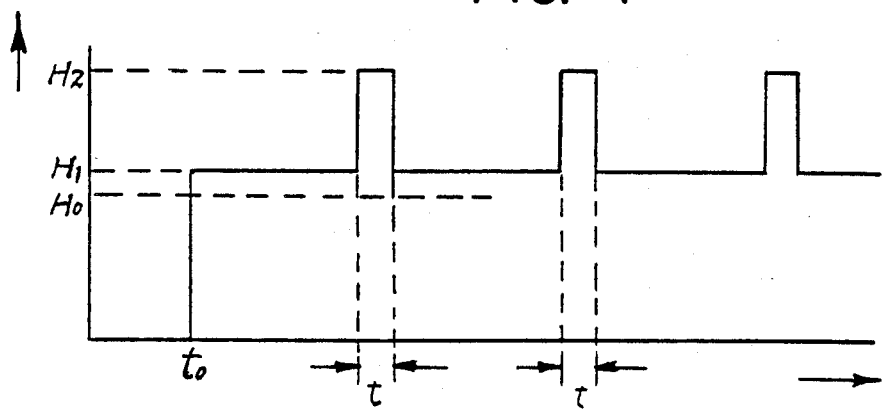
FIGS. 4 and 5 are different examples of the present invention, respectively.

Referring to an operation chart shown in FIG. 4, Ho represents the minimum shifting magnetic field intensity required to permit working pieces to generate a random motion from the state in which operation has been suspended; $H_1$ represents a slightly greater magnetic field intensity obtained by multiplying the magnetic field intensity Ho by a safety ratio to a degree for the normal operation, and $H_2$ represents a magnetic field intensity necessary to make the working pieces restart the random motion suspended during the regular operation while the shifting magnetic field is being applied. The operation of an apparatus is started with the magnetic field intensity at the level of $H_1$, and then the magnetic field intensity is increased to $H_2$ with a predetermined frequency for a short period of time t. For example, the magnetic field intensity may be increased from $H_1$ to $H_2$ for only several seconds, with several minutes as a period. The period need not always be constant, but may vary.

Under this operating method, because the magnetic field intensity increases periodically, the working pieces temporarily receive strong electromagnetic driving force due to the action of the magnetic field intensity each time the intensity increases. With this as a stimulus, the random motion becomes active. Consequently, even when the random motion of the working pieces starts to decrease because of friction or sucking force and the like as mentioned above, the working pieces will return to the normal random motion, so that the process operation can continue. Compared to the conventional operating method in which the magnetic field intensity is maintained at a level $H_2$ during the whole period of operation, the magnetic field intensity at the regular operation is as intense as $H_1$ and increased to $H_2$ only for a short time. Therefore, a power consumption is reduced to that extent, while heat loss is also decreased. Accordingly, an energy-saving and highly efficient operation is made possible. As a control means for conducting the above operation, terminals corresponding to the magnetic field intensity $H_1$, $H_2$ may be installed on the supply side of the shifting magnetic field generators and made to alternatively change over using a timer.

Figure 5:
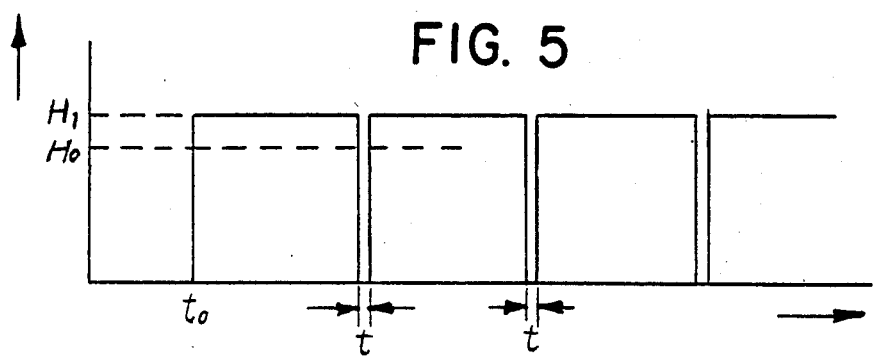

FIG. 5 shows another example of an operation chart. In this example, magnetic field intensity for the regular operation is set to $H_1$ and shifting magnetic field intensity is reduced to zero periodically only for a short time t. An electromagnetic stimulus is periodically applied also in this example. It has been confirmed by test results that when the random motion is lowered when working pieces reach the state in which they attract each other and begin to line up, reducing the shifting magnetic field to zero works to nullify the sucking force and loosen the union of the working pieces based on the magnetic sucking force. Accordingly, electromagnetic force produced by the action of the magnetic field applied immediately after the abovementioned zero state allows the working pieces to restart the random motion. To carry out this operating method in accordance with the apparatus of the invention, a timing mechanism is provided and operates in such a way that the periodic ON-OFF supply of power to the shifting magnetic field generators is alternatively repeated. This example like the preceeding one provides stable continuous random motion of working pieces with energy-saving effects.

As still another example, it is possible to allow magnetic field intensity to periodically change in the form of, for instance, a sine wave curve in addition to a square wave as shown in the figure.

As mentioned above, the present invention is intended for the regular operation with magnetic intensity slightly greater than the minimum magnetic field intensity required to permit working pieces to generate a random motion and by providing a periodic change of magnetic field intensity for the shifting magnetic field to apply a stimulus to the working pieces periodically, for a certain continuous random motion. In comparison with the operating method heretofore in use wherein working pieces continue a random motion only by maintaining a high magnetic field intensity during the whole period of operation, the method according to the present invention has advantages in lower power consumption, greater energy-saving effects and thus reduced operating cost.

From the foregoing, it will be observed that numerous variations may be effected without departing from the true spirit and scope of the novel concept of the invention. It is to be understood that no limitation with respect to the specific apparatus or method illustrated herein is intended or should be inferred. It is of course, intended to cover by the appended claims all such modifications as fall within the scope of the claims.

What is claimed is:

1. A method for processing substances electromagnetically in a container having two opposed generally parallel sides using working pieces responsive to a magnetic field for crushing, mixing and stirring substances contained in said container comprising causing said working pieces to generate a violent random motion due to electromagnetic force using two shifting magnetic field generators producing magnetic fields which shift in opposite directions and act on the work pieces from opposite sides of the container, the magnetic fields having a first intensity level slightly greater than the minimum magnetic field intensity required to generate random motion of said working pieces in said shifting magnetic field, and providing periodic changes in the magnetic field intensity level from said first magnetic field intensity level to substantially zero intensity for said shifting magnetic field in a cyclic manner, to thereby substantially maintain random motion of said working pieces.

2. The method as claimed in claim 1, wherein said shifting magnetic field intensity level is periodically reduced from said first magnetic field intensity level to substantially zero intensity for a relatively short time compared to the time period over which the first magnetic intensity level is maintained.

3. The method as claimed in claim 1 wherein said time period over which the first magnetic field intensity level is maintained in each cycle is on the order of several minutes.

4. The method as claimed in claim 1 wherein said time period over which the changed magnetic field intensity level is maintained in each cycle is on the order of several seconds.

5. An apparatus for processing substances electromagnetically, comprising: an elongated container having two opposed generally parallel sides for receiving substances to be processed and working pieces responsive to a magnetic field for processing the substances contained in said container;

a first shifting magnetic field generator adjacent to one side of the container producing a magnetic field which shifts in one direction within the container and a second shifting magnetic field generator adjacent to the opposite side of the container producing a magnetic field which shifts in the opposite direction within the container, the first and second shifting magnetic field generators being effective to generate a violent random motion due to the electromagnetic force resulting from said shifting magnetic fields; and means for periodically changing the intensity level of the shifting magnetic fields from a first magnetic field intensity level slightly greater than the minimum magnetic field intensity required to generate random motion of said working pieces to a substantially zero intensity level, to thereby substantially maintain random motion of said working pieces.

* * * * *